United States Patent [19]

Lee

[11] 4,333,722
[45] Jun. 8, 1982

[54] METHOD OF CONTROLLING ELECTROMAGNETIC ACTUATOR IN A CAMERA, AND ACTUATOR CONTROLLABLE THEREBY

[75] Inventor: James K. Lee, Pittsford, N.Y.

[73] Assignee: Eastman Kodak Company, Rochester, N.Y.

[21] Appl. No.: 219,168

[22] Filed: Dec. 22, 1980

[51] Int. Cl.³ .......................... G03B 9/02; G03B 9/62
[52] U.S. Cl. ..................................... 354/234; 354/271
[58] Field of Search ............. 354/234, 235, 271, 60 A, 354/43, 50, 51

[56] References Cited

U.S. PATENT DOCUMENTS

| | | | |
|---|---|---|---|
| 3,092,002 | 6/1963 | Frenk | 95/58 |
| 3,191,516 | 6/1965 | Corcoran | 95/59 |
| 3,353,131 | 11/1967 | Stubbs et al. | 336/130 |
| 3,561,847 | 2/1971 | Kitsopoulos et al. | 354/271 X |
| 3,987,473 | 10/1976 | Kondo | 354/234 |
| 4,005,448 | 1/1977 | Iwata et al. | 354/234 X |
| 4,024,552 | 5/1977 | Kondo | 354/234 |
| 4,041,512 | 8/1977 | Iwata et al. | 354/234 |
| 4,079,400 | 3/1978 | Kondo | 354/234 |

FOREIGN PATENT DOCUMENTS

| | | |
|---|---|---|
| 887007 | 8/1953 | Fed. Rep. of Germany . |
| 2939751 | 5/1980 | Fed. Rep. of Germany . |
| 3003462 | 8/1980 | Fed. Rep. of Germany . |

*Primary Examiner*—Michael L. Gellner
*Attorney, Agent, or Firm*—Thomas H. Close

[57] ABSTRACT

To control an electromagnetic actuator of the type having an armature movable in a magnetic field and means for urging the armature toward a rest position, a series of electrical pulses are applied to the actuator by a control circuit, the frequency of the pulses being above the cutoff frequency of the actuator, the position of the actuator being controlled by the duty cycle of the pulses. In a preferred embodiment, the actuator controls a shutter/aperture, the aperture size being determined by the duty cycle of the pulses, and the shutter time being controlled by the number of pulses applied to the actuator.

An actuator controlled by the control circuit is of the type having a planar coil on an armature, mounted for movement in the plane of the coil in a magnetic field. To reduce friction and simplify construction, the armature is mounted on a flexure spring which urges the armature toward its initial position and also serves as a conductor to provide current to the armature.

9 Claims, 15 Drawing Figures

METHOD OF CONTROLLING ELECTROMAGNETIC ACTUATOR IN A CAMERA, AND ACTUATOR CONTROLLABLE THEREBY

BACKGROUND OF THE INVENTION

1. Field of the Invention

This invention relates to electromechanical actuators in photographic cameras, and more particularly to such actuators that are easily adapted for control by digital computer.

2. Discussion Related to the Problem

The latest direction in photographic camera control is toward the use of a small digital computer, called a microprocessor, to control all camera functions. The microprocessor accepts digital imputs from a variety of transducers in the camera, such as scene light measuring apparatus, camera mechanism position indicators, automatic range finders, and the switch or button that is actuated by the photographer to initiate an exposure. The microprocessor responds to these imputs to produce control signals for various parts of the camera, such as lens focus, aperture size, shutter operation, mirror movement, and film advance. The control signals, as produced by the miroprocessor, are in a digital format; thus necessitating the step of digital-to-analog conversion when an analog output transducer is employed. Wherever possible, it is desirable to eliminate the step of digital-to-analog conversion by employing a transducer that can be driven directly by a digital signal, thereby simplifying the camera mechanism and reducing the overall cost. The search for simpler, more compact, and reliable electromechanical actuators, capable of being driven directly by digital signals, for moving elements such as aperture and shutter blades in photographic cameras, is being actively pursued.

U.S. Pat. No. 4,024,552 issued May 17, 1977 to Toshihiro Kondo, discloses a relatively simple electromechanically actuated optical blade comprising a rectangular planar conductive coil embedded in an opaque plastic blade. The blade is slidably mounted in grooves in the camera body, and one of the legs of the rectangular coil resides in the vicinity of a magnetic field that is directed perpendicular to the plane of the coil. When a current flows in the coil, a force, generally perpendicular to the one leg of the rectangular coil, is generated; causing the blade to slide in the grooves. Return springs are provided to return the blade to its starting position when the current ceases. Flexible extension leads supply the current to the coil from a source within the camera. In one disclosed embodiment, a pair of blades having triangular shaped cutouts cooperate to form progressively larger apertures as the blades move away from each other. The pair of blades are employed as a combination shutter and aperture; and the aperture size is determined by interposing adjustable stops in the paths of the blades.

Unfortunately, mounting a blade in a groove results in relatively high frictional forces if the blade should become even slightly canted in the groove due to any imbalance of force on the blade. For small coils and magnets, and using reasonable amounts of current, as required for compact camera applications, the electromagnetic force on the blade is marginally sufficient to reliably move the blade against the frictional forces retarding its movement. In addition, the flexible extension leads provide further resistance to movement of the blade. The use of adjustable stops to determine aperture size when the optical blade is used as a combination shutter/aperture complicates a mechanism whose primary virtue is simplicity.

The present invention is directed to an improved method of controlling a planar electromechanical actuator and an improved actuator that solves the problems noted above.

SOLUTION—SUMMARY OF THE INVENTION

According to the present invention, to control an electromechanical actuator of the type having an armature movable in a magnetic field and means for urging the armature toward a rest position, a series of electrical pulses are applied to the actuator by a control circuit, the frequency of the pulse being above the cutoff frequency of the actuator, the position of the actuator being controlled by the duty cycle of the pulses.

In a preferred embodiment of the invention, the control circuit includes a microprocessor that generates an actuator control pulse train in response to scene parameter inputs. The digital signal generated by the microprocessor is buffered and applied directly to the actuator, the actuator itself functioning as a digital to analog converter, thereby obviating the need for expensive digital to analog conversion when the actuator is driven by a digital signal source.

An improved actuator controllable by the method of the present invention is of the type having a planar coil on an armature, mounted for movement in the plane of the coil in a magnetic field. To reduce friction and simplify construction, the armature is mounted for movement on a flexure hinge, which urges the armature toward its initial position, and also serves as a conductor to supply current to the armature.

In the preferred embodiment, the flexure hinge is a λ-hinge defining a virtual pivot point about which the armature rotates, the armature is opaque material, and a dual function aperture/shutter blade is defined by an extension of the conductor support.

The control circuit determines the aperture size by the duty cycle of the control pulses and determines the shutter time by the number of pulses applied to the actuator.

DESCRIPTION OF THE DRAWINGS

The invention will be described with reference to the drawings, wherein.

DESCRIPTION OF THE PREFERRED EMBODIMENTS

Figure 1:
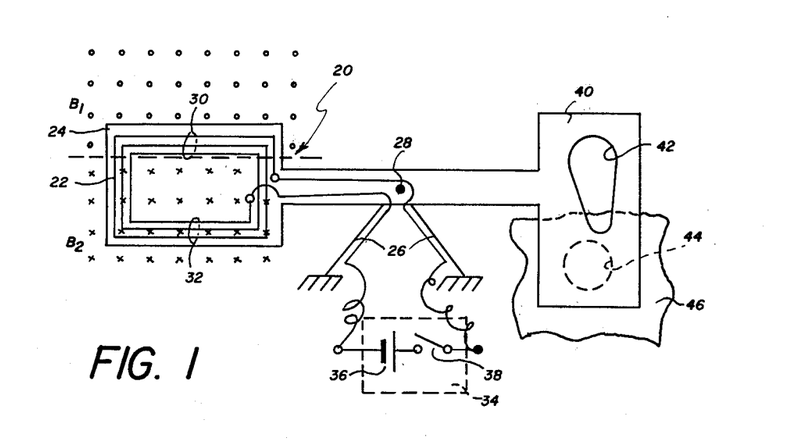
FIG. 1 is a schematic diagram of a planar coil actuator according to the present invention.

As shown schematically in FIG. 1, the planar actuator according to the present invention, includes an armature generally designated 20, having an elongated planar coil 22 carried by a coil support member 24. The coil support member 24 is preferably formed from a sheet of insulating material. Preferably, the planar coil is formed on the coil support member by photofabrication techniques. The coil support member 24 is mounted for movement by a flexure hinge 26. Flexure hinge 26 is a λ-hinge that defines a virtual pivot point 28 at a point where the extension of the legs of the λ-hinge intersect. Flexure hinge 26 may be formed by an extension of the coil support member, if the coil support material is a suitably stiff material (e.g. Kapton), or may be formed separately and attached to the armature. The flexure hinge provides a low friction mounting and an automatic restoring force to return the armature to an initial position after each operation.

Planar coil 22 defines first and second legs 30 and 32 generally perpendicular to the direction of movement of the coil about pivot point 28. A first magnetic field B1, generally perpendicular to the plane of the coil 22 and indicated by the arrow heads as pointing out of the drawing in FIG. 1, lies in the vicinity of the first leg 30. A second magnetic field B2 generally anti-parallel to the first magnetic field and indicated by arrow tails as pointing into the paper in FIG. 1, lies in the vicinity of the second leg, 32. Planar coil 22 is electrically connected to a control circuit 34, shown schematically as a battery 36 and a switch 38. When switch 38 is open, the actuator is inactive. Current for coil 22 supplied by battery 36 is carried along the legs of flexure hinge 26 either by flexible conductors formed on or bonded to the flexure hinge or, preferably, the flexure hinge itself is conductive and serves as the current conductor.

An aperture blade 40 carried on an end of the coil support member opposite from coil 22, forms a tapered aperture 42 for progressively uncovering a fixed aperture 44 in a camera mechanism plate 46. Preferably, the coil support member material is opaque and aperture blade 40 is integrally formed therefrom.

Figure 2:
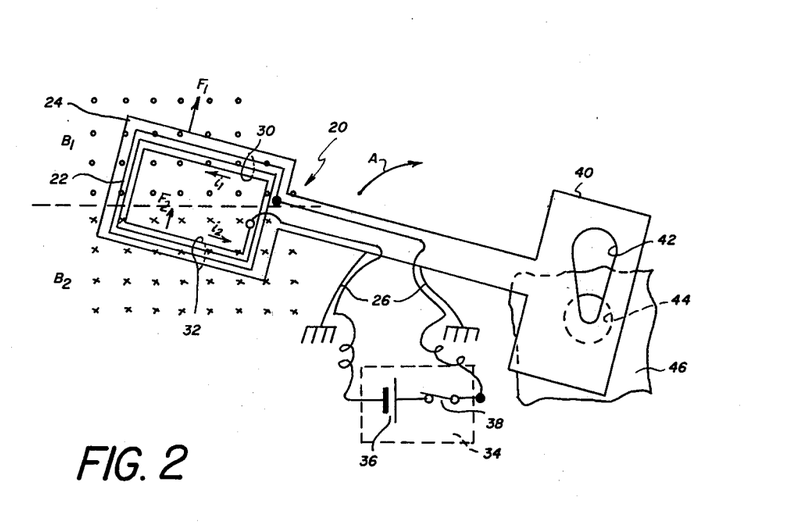
FIG. 2 is a schematic diagram similar to FIG. 1, showing the actuator in operation.

The operation of the actuator will now be described with reference to FIG. 2. When switch 38 is closed, current from battery 36 is caused to flow in planar coil 22. A current $i_1$ flows in the direction indicated in FIG. 2 in leg 30 of planar coil 22, and a current $i_2$ of equal magnitude flows in the opposite direction in leg 32 of coil 22, as shown in FIG. 2. As a result of the current $i_1$ flowing in magnetic field $B_1$, a force $F_1$ is generated on the first leg 30 of planar coil 22 in a direction tending to pivot the actuator around virtual pivot point 28. A force $F_2$, generally in the same direction as the force $F_1$, is generated by current $i_2$ in magnetic field $B_2$. The currents in other portions of the coil likewise generate forces on the coil, however the major components of these forces are perpendicular to the direction of movement of the coil and therefore are negligible for considering the performance of the actuator. The forces $F_1$ and $F_2$ act together to rotate armature 20 around virtual pivot point 28 in the direction of arrow A to displace the aperture blade 40 with respect to the fixed aperture 44 and therefore uncover the fixed aperture as shown in FIG. 2. By controlling the amount of current in coil 22, and hence the amount of movement of the aperture blade, the apparatus may be used to control the aperture size in a camera, or it may be used as a shutter to control exposure, or both.

When current ceases to flow in planar coil 22, flexure hinge 26 returns the actuator to its original position as shown in FIG. 1. For faster operation, the current may be momentarily reversed in coil 22 by providing suitable current switching means in control circuit 34 to provide an extra return force on the armature.

As seen from the above description, by elongating the coil in the direction of the generally parallel legs, more of the coil is employed to exert force, the losses due to resistance in unused portions of the coil are reduced, and the force to weight ratio of the actuator is improved. The flexure hinge is a relatively low friction mounting thereby making the actuator even more efficient.

Preferably, the mass of the armature and the mass of the shutter blade are selected to be balanced about pivot point 28 so that the actuator is not subject to forces due to gravity or linear acceleration.

Figure 3:
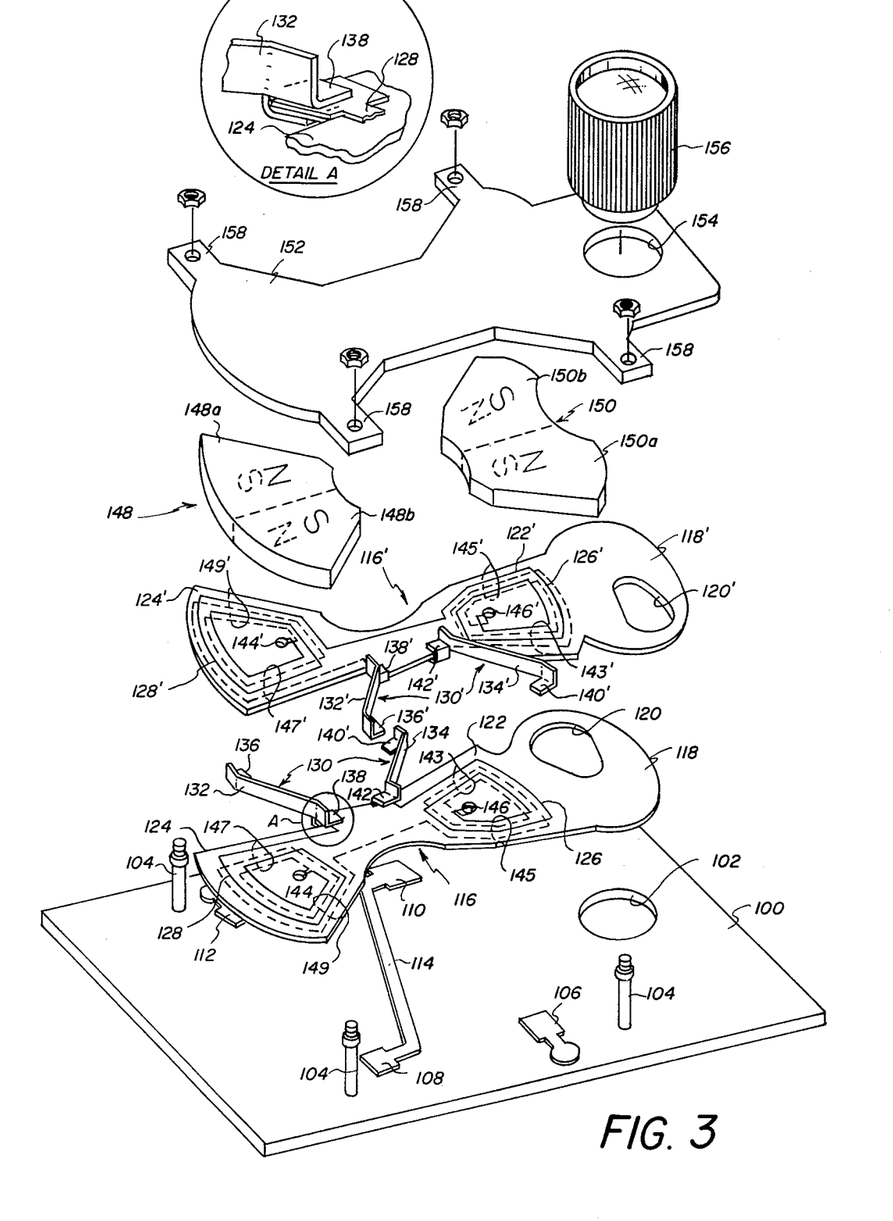
FIG. 3 is an exploded perspective view of the presently preferred embodiment of the planar coil actuator according to the present invention.

A presently preferred embodiment of the planar actuator according to the present invention, employed in an aperture/shutter, is shown in exploded perspective in FIG. 3. The actuator includes two pivoting armatures, with two planar coils on each armature. The actuator is supported on a mechanism plate 100 which forms a fixed aperture 102. The mechanism plate, made from 24 gauge mild steel, is covered with a layer of electrically insulating porcelain enamel and carries stand-off posts 104. Four conductive mounting pads 106, 108, 110 and 112, are formed on the surface of the enamel by the process of screening the pattern on the enamel using a paint containing a powdered metal, and firing the paint to sinter the powdered metal. Conductive mounting pads 106 and 112 are connected to electrical contacts, and pads 108 and 110 are electrically connected by a conductor strip 114. A first armature generally designated 116 includes an aperture blade 118 defining a tapered aperture 120 for progressively uncovering fixed aperture 102, and two coil support portions 122 and 124. Two spiral coils 126 and 128 are formed on the coil support portions 122 and 124 respectively. The armature is formed from 1 to 3 mil thick polyethylene terephthalate film loaded with 1 micron size particles of carbon to render the film opaque. The armature is about 7 cm long and about 2.5 cm wide at its widest point. The spiral coils are formed on the surface of the armature by standard photofabrication techniques. A thin layer of conductor metal such as copper is deposited on the surface of the armature material, and the coil pattern is formed using photolithography in the relatively thin layer of metal. The pattern of thin metal is then built up to the desired thickness by further plating on to the thin metal pattern.

The armature is supported for pivotal movement by a flexure hinge 130 comprising a pair of leaf springs 132 and 134 formed from 2 mil beryllium sheet. The flexure hinge defines a virtual pivot at the point where the projection of the leaf springs intersect. Leaf spring 132 defines tabs 136 and 138 projecting at right angles from the spring on each end. Tab 138 is bent around the edge of the armature and is soldered to a mounting pad formed at the end of the coil on the armature. Detail A in FIG. 3 illustrates this method of attaching the leaf spring to the armature. Similarly, leaf spring 134 defines tabs 140 and 142 at each end, tab 142 being attached to the armature. Coil 128 starts where leaf spring 132 is connected to the armature and proceeds on the top surface of the armature, as viewed in FIG. 3, proceeding counterclockwise in an inward spiral and into a through-hole 144 in the center of the coil from whence it emerges to the other side of the armature to continue in a counterclockwise spiral out from the center as shown in dotted lines in FIG. 3. The conductor pattern proceeds across the underside of the armature to the other coil support portion 122 counterclockwise in an inward spiral around support portion 122 to a center through-hole 146 and back up to the top surface of the armature. The conductor then defines an outward spiral on the top surface of conductor support 122 ending at the mounting pad for flexure spring 134 where tab 142 makes electrical contact with the coil. As shown in FIG. 3, coil 126 defines two legs 143 and 145 arranged generally radially of the virtual pivot point defined by flexure hinge 130, i.e. generally perpendicular to the direction of movement of the armature. Likewise, coil 128 defines two legs 147 and 149 arranged generally radially of the virtual pivot defined by the flexure hinge 130. Tabs 136 and 140 on the other ends of the flexure leaf springs are soldered to mounting pads 112 and 110 respectively. A second armature, generally designated 116' is identical to the first armature 116 except that it has been turned over on its back. The parts of armature 116' are numbered similarly to the parts of armature 116 with primes ('). Tabs 136' and 140' of leaf springs 132' and 134' respectively, are soldered to mounting pads 108 and 106 respectively.

A permanent ceramic magnet 148, approximately 30 mm thick, produces the magnetic fields in the vacinity of coils 128 and 128'. The magnet 148 is magnetized in a direction perpendicular to its top and bottom surfaces (as viewed in FIG. 3). One-half of magnet 148 (designated 148a) is magnetized with the north magnetic pole on the top and the south magnetic pole on the bottom, and the other half (designated 148b) is magnetized with the south magnetic pole on the top and the north magnetic pole on the bottom. A second permanent ceramic magnet 150, similar to magnet 148, produces the magnetic fields in the vicinity of coils 126 and 126'. The magnets 148 and 150 are cemented to the underside of a holder 152 made from 24 gauge mild steel. Holder 152 defines an aperture 154 for mounting a taking lens 156. Magnet holder 152 has four tabs 158, for receiving standoff posts 104 to suspend the magnets over the coils of the armatures and form a gap between the magnets and the mechanism plate 100 in which the armatures 116 and 116' reside.

Figure 4:
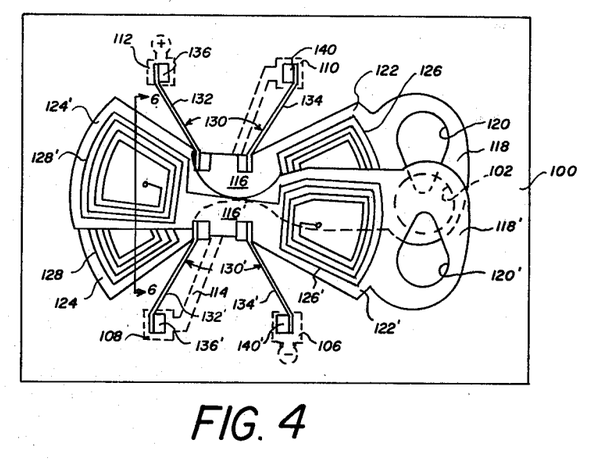
FIG. 4 is a top view of the actuator shown in FIG. 3 with the magnets removed to reveal the orientation of the coils.
Figure 6:
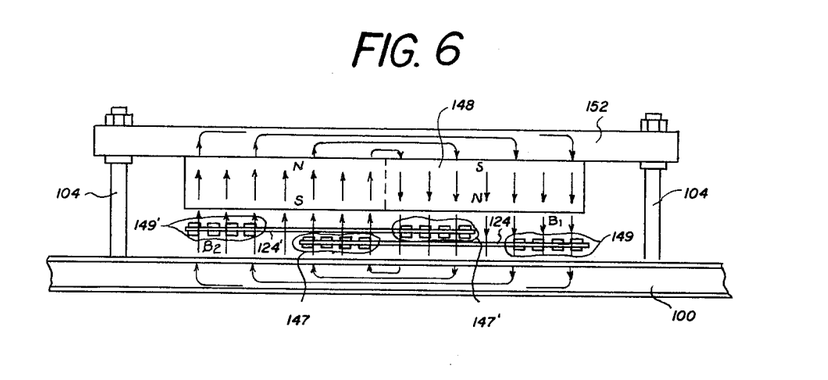
FIG. 6 is a partially schematic cross section, taken along line 6—6 in FIG. 4, of the actuator according to the presently preferred embodiment of the invention, illustrating the magnetic field in relation to the coils.

FIG. 4 is a top view of the actuator with the magnet holder 152 and magnets 148 and 150 removed to reveal the positions of the armatures at rest, with aperture 102 covered by blades 118 and 118'. FIG. 6 is a cross section of the actuator taken along line 6—6 in FIG. 4 showing the lines of magnetic flux generated by magnet 148 in the vicinity of coils 128 and 128'. As shown in FIG. 6, leg 147 of coil 128 and leg 149' of coil 128' lie in a magnetic field $B_2$ directed upward from the mechanism plate 100 to magnet 148. Leg 149 of coil 128 and leg 147' of coil 128' lie in a magnetic field $B_1$ pointing down from the permanent magnet toward the mechanism plate 100. FIG. 6 shows how the mild steel mechanism plate 100 and the mild steel magnet holder 152 provide flux return paths for the magnetic field produced by magnet 148.

Figure 5:
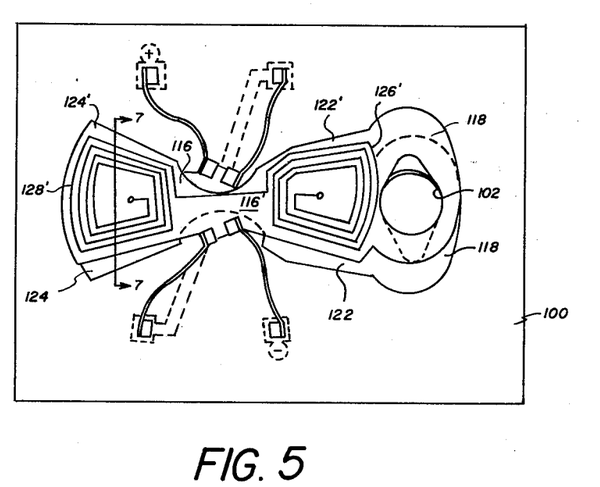
FIG. 5 is a top view similar to FIG. 4, showing the actuator in operation.
Figure 7:
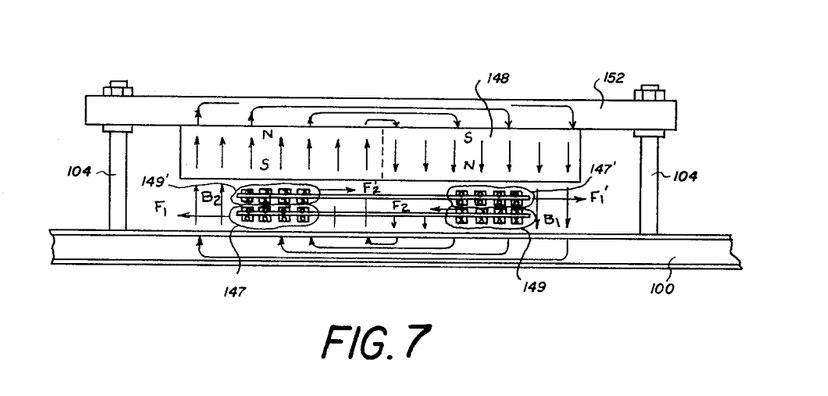
FIG. 7 is a partially schematic cross section, taken along line 7—7 in FIG. 5, similar to FIG. 6, showing the actuator in operation.

The operation of the actuator will now be described with reference first to FIG. 4. When the positive terminal of an electrical power supply is connected to the terminal adjacent mounting pad 112 and the negative terminal of the power supply is connected to the terminal adjacent mounting pad 106, current flows counterclockwise in coils 128 and 126, and clockwise in coils 128' and 126'. The forces generated on the coils due to the currents flowing in the magnetic fields produced by permanent magnets 148 and 150 (not shown in FIG. 4), cause armature 116 to pivot in a counterclockwise direction, and armature 116' to pivot in a clockwise direction thereby moving blades 118 and 118' to uncover aperture 102, as shown in FIG. 5. FIG. 7 is a cross section through coils 128 and 128', taken along lines 7—7 in FIG. 5, showing the forces generated on the active legs of the coils when current flows as described above. The directions of current flow are indicated by arrow heads and tails, the heads indicating current flowing into the page as viewed in FIG. 7, and the tails indicating current flowing out of the page.

Current flowing in a direction out of the page in leg 147' of coil 128' in the downwardly direction magnetic field $B_1$ generates a force $F_1'$ directed to the left as viewed in FIG. 7. Current flowing in a direction into the page in leg 149' of coil 128' in the upwardly directed magnetic field $B_2$ generates a force $F_2'$ likewise directed to the left. Similarly, the forces $F_1$ and $F_2$ generated in legs 147 and 149 of coil 128 are both directed to the right.

Since the forces on the armatures 116 and 116' of the actuator are proportional to the current flowing in the coils, the position of the actuator, and hence the extent to which fixed aperture 102 is uncovered by blades 118 and 118', can be controlled by controlling the current supplied to the actuator.

When position control is attempted by merely controlling the amount of current supplied to the actuator, static friction perturbes the final position achieved by the armatures, resulting in unacceptable position error. The effects of static friction are partially overcome by coating the armatures with a thin layer of "teflon" plastic in the form of a spray paint. In addition, the effects of static friction are overcome, and reliable, repeatable position control is achieved by applying the driving current in pulses of constant amplitude. This technique provides a small dither signal that breakes the remaining static friction. The frequency of the pulses in the control signal is chosen to be somewhat above the cutoff frequency in the frequency vs. response curve of the actuator, but not so far above the cutoff frequency that the system does not respond, since the armatures must vibrate enough to break the static friction.

The cutoff frequency is the point in the frequency vs. response curve of the actuator, where the response is down about 3 db from the DC response. Preferably, the frequency of the pulses is chosen to be at a point about 26 db down from the DC response, or about four times the natural frequency of the actuator. The use of pulsed current to drive the actuator makes the actuator compatible with direct digital control and has the added advantage that inexpensive drive circuits may be employed. The average current to the actuator and hence the final position achieved by the actuator is controlled by varying either the duty cycle of a fixed frequency pulse train, or by varying the repetition frequency of a pulse of fixed duration, as long as the pulse repetition frequency remains above the cutoff frequency of the actuator. The actuator is operated in a slightly underdamped condition so that there is a slight overshoot of, and then a settling into the final position. Slight underdamping allows a moderately fast opening time and relatively quick settling into the desired final position. The damping is determined partially by the back EMF in the coils in the magnetic field, and mostly by the dynamic friction of the actuator. The dynamic friction is controlled by raising or lowering the magnet holder over the armatures.

Figure 8A:
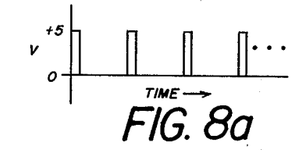
FIGS. 8a–c are graphs illustrating the pulse duration modulated signals used to drive the actuator according to the preferred embodiment of the present invention.
Figure 8B:
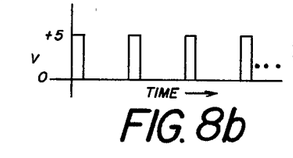
Figures 8C, 8Z:
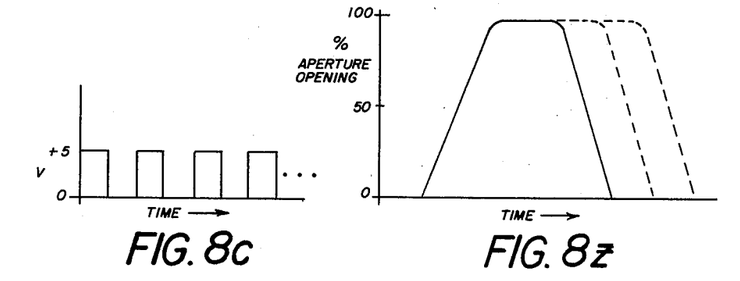
FIGS. 8x–z are graphs showing the actuator response to the pulse duration modulated signals shown in FIGS. 8a–c respectively.
Figure 8X:
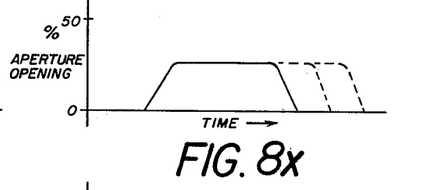
Figure 8Y:
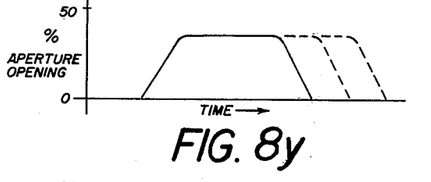

In the preferred embodiment of the invention, the pulse duration is modulated to control the aperture size, and the number of pulses applied to the actuator controls the shutter time. FIGS. 8a-c illustrate a series of pulse trains of the type used to control the actuator in the preferred embodiment of the invention. The pulse repetition frequency and pulse amplitude of each pulse train is the same, but the duty cycle increases progressively from FIG. 8a to FIG. 8c. FIGS. 8x-z depict the actuator response to the pulse trains illustrated in FIGS. 8a-c respectively, in terms of the percent of the fixed aperture that is uncovered versus time. The series of dotted lines in FIGS. 8x-z indicate the effects on total shutter open time of progressively longer pulse trains.

Figure 9:
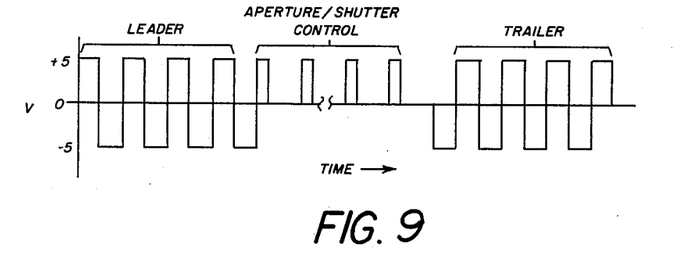
FIG. 9 is a graph showing a pulse duration modulated signal, including 50% duty cycle leading and trailing pulses, used for driving the actuator according to the preferred embodiment of the present invention.

To reliably establish a zero position both before and after each actuation, a stream of leader and trailer pulses of both positive and negative polarity and fifty percent duty cycle are supplied to the actuator at the beginning and end of each actuation. FIG. 9 illustrates a full current profile showing the fifty percent duty cycle leader pulses, the aperture/shutter control pulses, and the fifty percent duty cycle trailer pulses. The leader and trailer pulses essentially "shake" the actuator to overcome static friction both before and after each actuation.

According to a presently preferred embodiment of the invention, the control system for controlling the actuator comprises a microprocessor that receives scene parameter inputs such as scene brightness and is programmed to produce the appropriate pulse train for driving the actuator in response to the scene parameter inputs.

Figure 10:
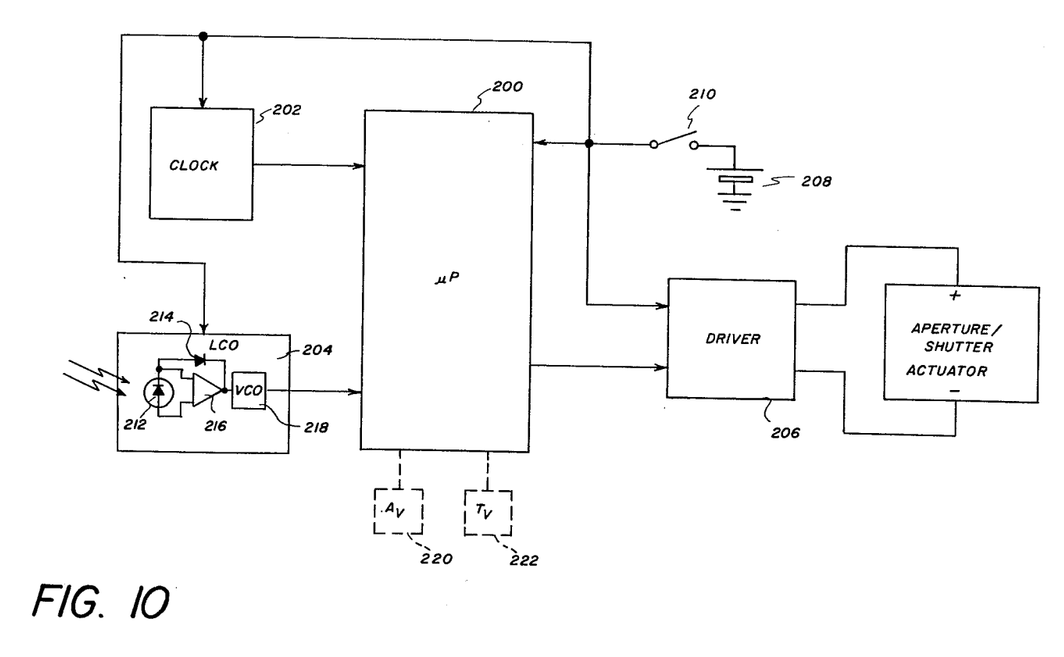
FIG. 10 is a schematic diagram of a control circuit for producing the pulse duration modulated control signals according to the preferred embodiment of the present invention.

FIG. 10 is a schematic of the control system according to the preferred embodiment of the invention. The control system comprises a microprocessor 200, a reference oscillator 202, a light controlled oscillator 204, an output driver 206, a power supply 208, and an actuator switch 210. The light controlled oscillator 204 includes a photosensitive element such as photodiode 212, a logarithmic feedback diode 214, an operational amplifier 216, and a voltage controlled oscillator 218. The photodiode, operational amplifier, and feedback diode, are responsive to scene light to produce a voltage proportional to the log of the intensity of the scene light. The voltage is applied to the voltage controlled oscillator to produce a pulse train having a repetition frequency proportional to the log of the intensity of scene light.

In operation, when switch 210 is closed by the operator of the camera, power is supplied from power supply 208 to the rest of the control circuit. The reference oscillator 202 starts to produce clock pulses used to time the operations of the microprocessor, the microprocessor 200 is initialized, and the light controlled oscillator 204 starts producing the pulse train having a frequency proportional to the log of scene light. The microprocessor 200 is programmed to sample the output of the light controlled oscillator 204 for a predetermined time interval, counting the number of pulses received during the time interval. The final count is proportional to the log of the scene brightness. The microprocessor employs a table lookup using the pulse count as an address to retrieve the required pulse duration and total number of pulses to produce the proper aperture and shutter time for the given scene brightness. The microprocessor then constructs the pulse train from the information retrieved from the table, adds the leader and trailer pulses, and applies the pulse train to driver 206. Driver 206 buffers the pulse train from the microprocessor and applies the pulse train to the shutter/aperture actuator. The control system is easily adapted for total program control, shutter preferred, or aperture preferred operation. If shutter or aperture preferred operation are employed, in addition to measuring the scene light, the microprocessor retrieves desired aperture or shutter settings from manually set inputs indicated in phantom by boxes 220 and 222 in FIG. 10. The microprocessor then uses the manually input aperture or shutter preference to compute or retrieve from a table lookup the proper actuator pulse control train. The microprocessor is easily programmed to override any manual input that would result in improper exposure.

The invention has been described in detail with particular reference to certain preferred embodiments thereof, but it will be understood that variations and modifications can be effected within the spirit and scope of the invention.

I claim:

1. In a camera, of the type having an electromagnetic actuator, including an armature having an electrical conductor movable in a magnetic field in response to an electrical current being applied to the conductor, and means for urging the armature toward a relative rest position; the improvement comprising control circuit means for supplying a series of current pulses to said conductor, the frequency of said pulses being above the cutoff frequency of said actuator, such that the duration of said pulses in said series determines the extent of movement of said armature, and the number of pulses in said series determines the duration of the movement.

2. The invention claimed in claim 1, wherein said actuator is connected to a shutter/aperture, and wherein the duty cycle of pulses in said series determines the aperture size and the number of pulses in said series determines the shutter time.

3. In a camera of the type having an electromagnetic actuator including an armature having a conductor, means for producing a magnetic field in the vicinity of the conductor, means for mounting the armature for displacement relative to the magnetic field producing means in response to an electrical current being applied to the conductor, conductor means for applying an electrical current to the armature conductor and spring means connected between the armature and the magnetic field producing means for urging the armature toward a rest position, the improvement wherein:

said mounting means, said conductor means, and said spring means comprise a conductive flexure hinge having first and second conductive flexible elements, said armature conductor being electrically connected between said flexible elements.

4. In a camera, an electromagnetic actuator for moving a camera element such as an aperture blade, shutter blade, or the like, comprising:
 (a) an armature including a conductor;
 (b) flexure means for mounting said armature for movement with respect to the camera and for urging said armature toward an initial position, said flexure means being comprised of electrically conductive material, and having first and second flexible members connected between said armature and the camera, said conductor of said armature being electrically connected between said first and second flexible members;
 (c) means for producing a magnetic field in the vicinity of said conductor; and
 (d) means electrically connected to said flexure means for supplying electrical current to said conductor.

5. The invention claimed in claim 4, wherein said armature includes a substantially planar conductor support means for carrying said conductor.

6. The invention claimed in claim 5, wherein said planar conductor support means also forms the camera element moved by the actuator.

7. The invention claimed in claim 4, wherein said flexure means provides for movement of said armature about a virtual pivot axis generally perpendicular to the plane of said conductor support and substantially coincident with the center of gravity of said armature and wherein said conductor coil and said camera element are balanced about said pivot point.

8. The invention claimed in claim 7, wherein said flexure means is a λ-hinge forming a virtual pivot axis passing through said armature.

9. The invention claimed in claim 4, wherein said flexure mounting means comprises an extension of said armature.

* * * * *